J. L. Chapman,
Cock,
Nº 2,812.                    Patented Oct. 12, 1842.

UNITED STATES PATENT OFFICE.

JNO. LEE CHAPMAN, OF BALTIMORE, MARYLAND.

HYDRANT.

Specification of Letters Patent No. 2,812, dated October 12, 1842.

*To all whom it may concern:*

Be it known that I, JOHN LEE CHAPMAN, of the city of Baltimore, in the State of Maryland, have made an improvement in the manner of combining and using with hydrants the cock for hydraulic and pneumatic purposes for which I obtained Letters Patent of the United States, dated October 11, 1841, by which combination and arrangement the delivery of the water therefrom is regulated and governed in a more perfect manner than upon any of the modes of construction heretofore adopted; and I do hereby declare that the following is a full and exact description thereof.

In the accompanying drawing A, A, are the two ends of the cock, one of which ends is to be connected with the supply pipe from a reservoir, or from water works, from which the water is supplied, under pressure; and the other is connected to the delivery pipe, in the usual manner.

B, B, is a shaft carrying two cranks C, and D; which shaft turns on gudgeons at the upper end of the hydrant box, or case.

E, is a handle attached in any suitable manner to the shaft B, B. This handle passes through a slot, or opening in the hydrant case, and by its means the shaft may be made to turn on its gudgeons.

The cranks C and D, are placed at right angles to each other; the former may have a throw of one fourth of an inch, the latter a throw of three inches. The crank C is connected to the plug shaft F, of the cock by means of a connecting rod G, which were the shaft B, B, turned half around, might give a play of half an inch to the plug, or of one-fourth of an inch by a quarter revolution.

H, is a weight, say of ten pounds, more or less, which is suspended from the crank D. When this crank is in a horizontal position the power with which the plug of the cock is held down will be proportioned to the leverage of the two cranks; and a weight which is readily moved by the handle E, is thus made to act with very great force in closing the way of the cock, and effectually controls it.

Figure 1:
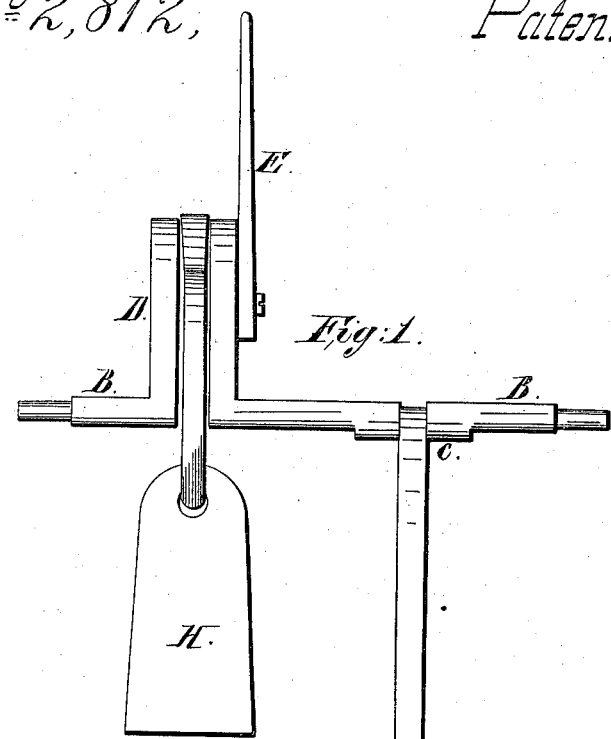
Figure 2:
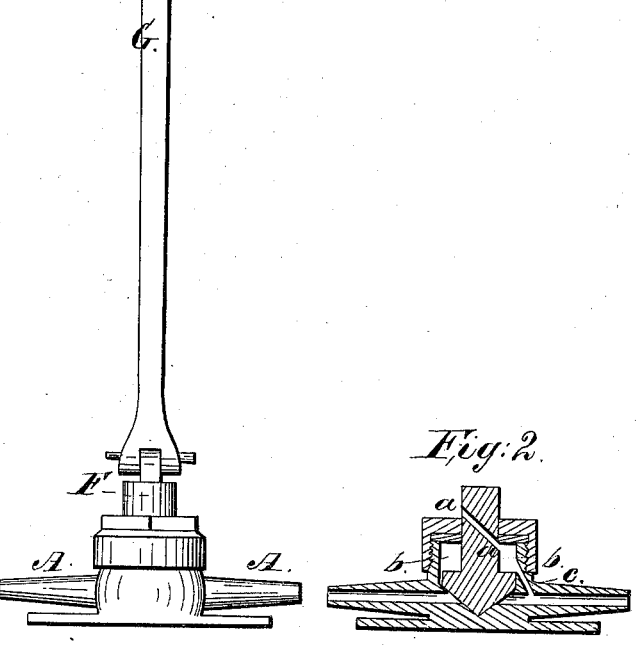

In order to discharge the waste water I drill a hole of about one-eighth of an inch in diameter through the plug or valve shaft F, as shown at $a$, in the section Fig. 2, leading into the chamber $b$, and thence into the delivery pipe, as shown at $c$; and when the valve shaft is raised the waste water way will be thereby completely cut off and will be again restored when it is depressed.

Having thus fully described the nature of my improvement in the manner of combining and arranging the cock through which the water is to pass in a hydrant, with the apparatus by which it is to be governed in opening and closing; what I claim as new therein, and desire to secure by Letters Patent, is—

1. The manner in which I employ the double crank shaft, with its two cranks so that a weight upon one of the cranks shall operate with great force in closing the way of the cock, the plug of which is moved by a short crank, connected thereto by a suitable rod; the whole being arranged, combined, and operating, substantially in the manner herein set forth.

2. I also claim the manner described of forming the waste water way by means of the holes $a$, $c$, drilled through this plug of the valve shaft, and through the delivery pipe, as applied to the cock for which I obtained Letters Patent on the eleventh day of October, 1841, and represented in the accompanying drawing.

JOHN LEE CHAPMAN.

Witnesses:
 THOS. P. JONES,
 E. L. BRUNDAGE.